US006937376B2

(12) United States Patent
Takakubo (10) Patent No.: US 6,937,376 B2
(45) Date of Patent: Aug. 30, 2005

(54) SCANNING OPTICAL SYSTEM (75) Inventor: Yutaka Takakubo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/721,907

(22) Filed: Nov. 26, 2003

(65) Prior Publication Data
US 2004/0104339 A1 Jun. 3, 2004

(30) Foreign Application Priority Data
Nov. 29, 2002 (JP) ........................................ 2002-346973

(51) Int. Cl.[7] .............................................. G02B 26/08
(52) U.S. Cl. ....................................... 359/216; 359/219
(58) Field of Search ................................ 359/216, 219; 347/243, 259–261; 358/481

(56) References Cited

U.S. PATENT DOCUMENTS

| 5,136,418 A | * | 8/1992 | Itabashi ...................... 359/218 |
| 5,194,982 A | * | 3/1993 | Morimoto .................... 359/216 |
| 5,245,462 A | | 9/1993 | Kanai et al. |
| 5,488,502 A | | 1/1996 | Saito |
| 6,130,768 A | | 10/2000 | Ono |
| 2003/0067665 A1 | | 4/2003 | Iizuka |

FOREIGN PATENT DOCUMENTS

| JP | 5-142495 | 6/1993 |
| JP | 7-113950 | 5/1995 |
| JP | 2000-47133 | 2/2000 |

* cited by examiner

Primary Examiner—James Phan
(74) Attorney, Agent, or Firm—Greenblum & Bernstein, P.L.C.

(57) ABSTRACT

There is provided a scanning optical system which includes a light source, a line-like image forming optical system, a polygonal mirror, and an imaging optical system. The line-like image forming optical system forms a line-like image extending in the main scanning direction in the vicinity of a reflective surface of the polygonal mirror, and if the number of reflective surfaces of the polygonal mirror is less than or equal to six and if $|m|>1.85$, the following condition (1) is satisfied:

$$r<5\cos(w/2f)/[2|m|\{1-\cos(w/2f)\}] \qquad (1)$$

where r represents a radius of an inscribed circle of the polygonal mirror, m represents a lateral magnification of the imaging optical system in the auxiliary scanning direction, f represents a focal length of the imaging optical system in the main scanning direction, and w represents half of a scanning width.

7 Claims, 8 Drawing Sheets

SCANNING OPTICAL SYSTEM

BACKGROUND OF THE INVENTION

The present invention relates to a scanning optical system for forming a laser beam scanning on a scan target surface.

In general, a scanning optical system is employed in, for example, a laser beam printer, a digital copying machine, a laser fax machine and a laser plotter. In such an apparatus, the scanning optical system is used to form a beam spot which is on/off modulated according to image information and which scans on the scan target surface (e.g., a photoconductive drum).

Hereafter, a direction in which a beam spot is scanned on the scan target surface is referred to as a main scanning direction, and a direction perpendicular to the main scanning direction on the scan target surface is referred to as an auxiliary scanning direction. In the following description, the shape of optical elements, directions of power of the optical elements and the like are described with reference to the main and auxiliary scanning directions on the scan target surface. That is, if an optical element is described to have a refractive power in the main scanning direction, the power affects the beam in the main scanning direction on the scan target surface regardless of the orientation of the element.

Figure 8:
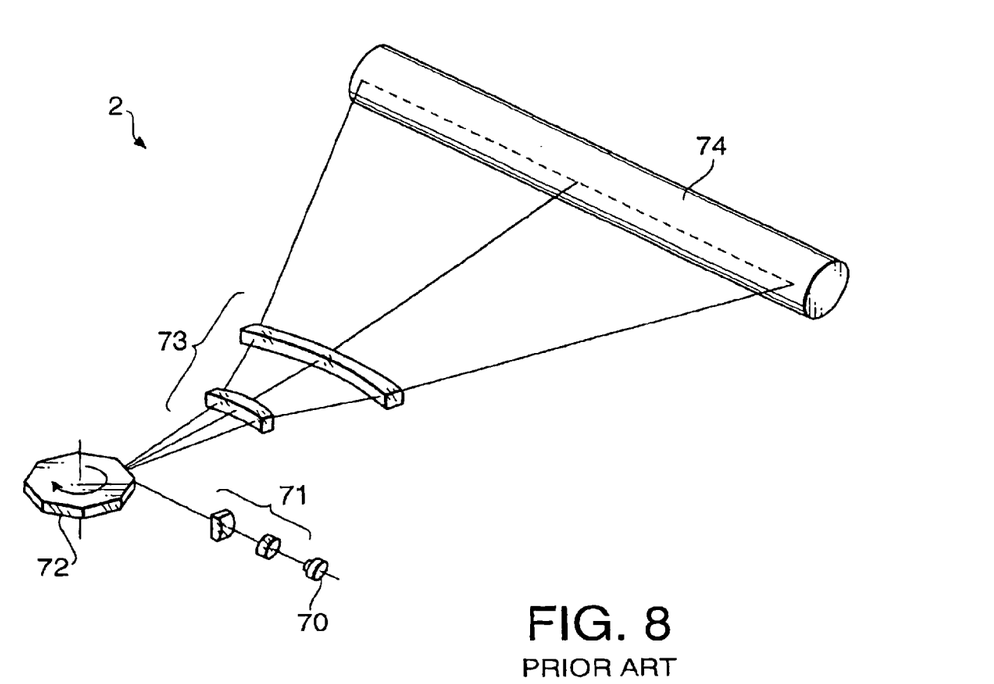
FIG. 8 shows a configuration of a conventional scanning optical system.

FIG. 8 shows a configuration of the above mentioned conventional scanning optical system 2. The scanning optical system 2 includes a laser source 70, a line-like image forming optical system 71, a polygonal mirror 72, an imaging optical system 73, and a photoconductive drum 74.

The laser beam emitted by the laser source 70 is converged in the auxiliary scanning direction by the line-like image forming optical system 71 to form a line-like image extending in the main scanning direction in the vicinity of a reflective surface of the polygonal mirror 72 rotating about its rotational axis at a constant angular speed.

The beam emerged from the line-like image forming optical system 71 is dynamically deflected by the polygonal mirror 72 within a predetermined angular range. Then, the imaging optical system 73 converges the deflected laser beam on the scan target surface to form a beam spot scanning in the main scanning direction at a constant speed. Since an outer surface (i.e., the scan target surface) of the photoconductive drum 74 is moved in the auxiliary scanning direction by rotation of the photoconductive drum 74 about its rotational axis, a two dimensional image consisting of a plurality of dots can be formed on the outer surface of the photoconductive drum 74.

Meanwhile, the polygonal mirror 72 is required to be configured such that all of the reflective surfaces thereof are exactly parallel with the rotational axis of the polygonal mirror 72. However, to make all of the reflective surfaces of the polygonal mirror exactly parallel with the rotational axis thereof during manufacturing process of the polygonal mirror is impossible. Therefore, in general, the polygonal mirror 72 includes a so-called facet error in which one or more reflective surfaces slightly tilt with respect to the rotational axis.

Figure 9A:
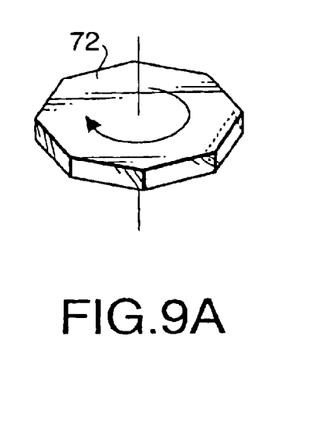
FIG. 9A is a perspective view of a polygonal mirror of the scanning optical system shown in FIG. 8.
Figure 9B:
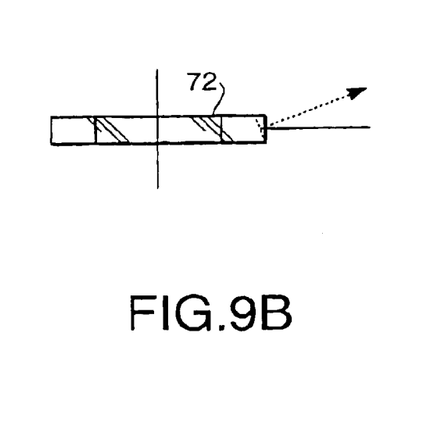
FIG. 9B is a side view of the polygonal mirror shown in FIG. 9A.

The facet error will be explained in detail with reference to FIGS. 9A, 9B and 10. FIG. 9A is a perspective view of the polygonal mirror 72. FIG. 9B is a side view of the polygonal mirror 72 viewed along a line perpendicular to the rotational axis of the polygonal mirror 72. If a reflective surface is tilted with respect to the rotational axis of the polygonal mirror 72 as shown by a broken line in FIG. 9A, a beam reflected by the tilted reflective surface deviates in the auxiliary scanning direction from an ideal optical path as shown by a dashed arrow in FIG. 9B. Consequently, the beam spot is formed at a position shifted in the auxiliary scanning direction form an ideal position on the scan target surface.

To avoid ill effects caused by the facet error, the scanning optical system 2 employs a configuration explained below. FIG. 10 is an optical block diagram of the scanning optical system 2 viewed along a line perpendicular to the auxiliary scanning direction. As shown in FIG. 10, a position of a reflective surface of the polygonal mirror 72 and a position at which the line-like image is formed by the line-like image forming optical system 71 are set substantially consistent with each other. Further, the position of the line-like image and the outer surface of the photoconductive drum 74 (i.e., the scan target surface) are set optically conjugate with each other in the auxiliary scanning direction with respect to the imaging optical system 73.

Figure 10:
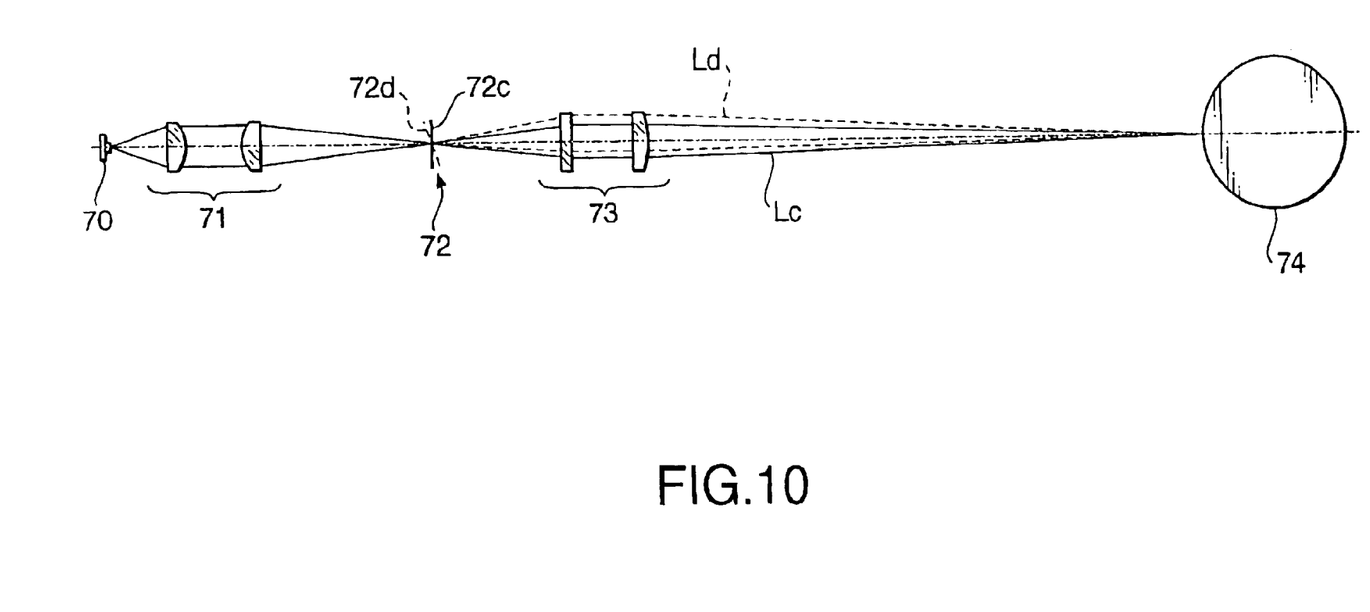
FIG. 10 is an optical block diagram of the conventional scanning optical system viewed along a line perpendicular to the auxiliary scanning direction illustrating a optical path when a facet error occurs.

In FIG. 10, the reflective surface indicated by a solid line 72c shows a situation in which the facet error is not caused, and the reflective surface indicated by a broken line 72d shows a situation in which the facet error is caused. Since the position of the line-like image and the outer surface of the photoconductive drum 74 are set optically conjugate with each other, even if the line-like image is reflected by a tilted reflective surface (72d) of the polygonal mirror 72, an image point of the beam reflected by the tilted reflective surface 72d coincides with an image point of the beam reflected by a normal reflective surface (72c). In FIG. 10, a beam Ld indicated by broken lines is the beam reflected by the tilted reflective surface 72d, and a beam Lc indicated by solid lines is the beam reflected by the normal reflective surface 72c.

By employing the configuration shown in FIG. 10 to avoid the ill effects of the facet error, the polygonal mirror 72 is not required to be configured such that each reflective surface is exactly parallel with the rotational axis of the polygonal mirror. Accordingly, the manufacturing cost of the scanning optical system 2 can be reduced.

Figure 11:
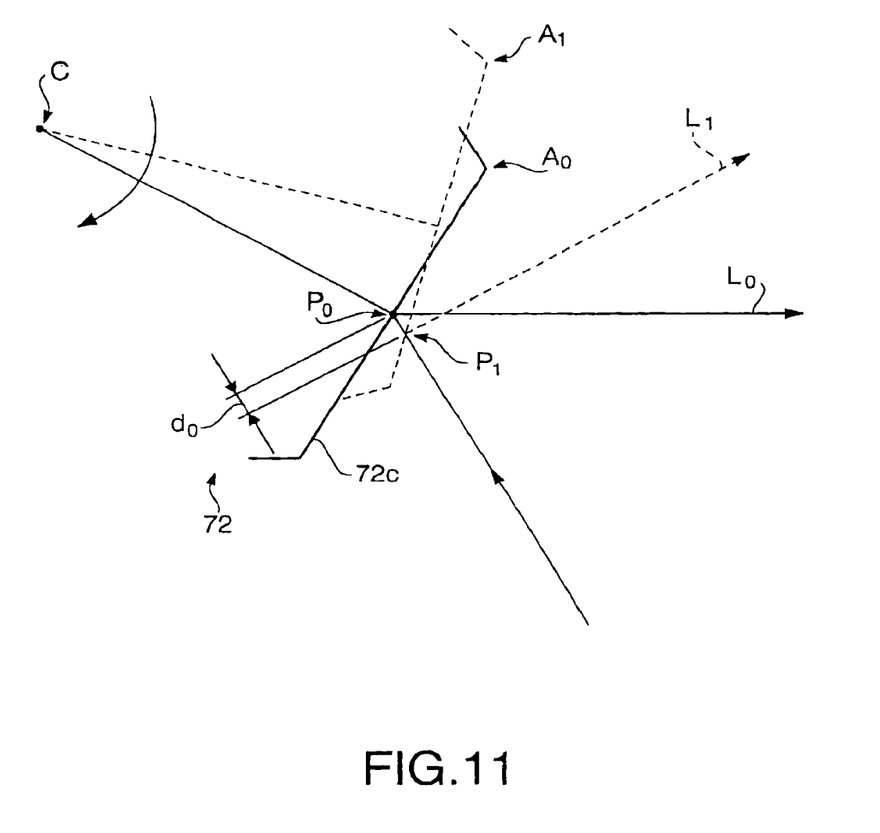
FIG. 11 illustrates a change of a deflection point caused in connection with rotation of the polygonal mirror.

A point at which the beam proceeding toward the polygonal mirror 72 is reflected by a reflective surface of the polygonal mirror 72 is referred to as a "deflection point". FIG. 11 illustrates a change of the deflection point caused in connection with rotation of the polygonal mirror 72. As shown in FIG. 11, when the polygonal mirror 72 is positioned at a rotational position $A_0$, the beam proceeding toward the polygonal mirror 72 is reflected at a point $P_0$ on the reflective surface 72c. Meanwhile, when the polygonal mirror 72 is positioned at a rotational position $A_1$, the beam proceeding toward the polygonal mirror 72 is reflected at a point $P_1$ on the reflective surface 72c. As a result, the deflection point shifts by a distance $d_0$ along an optical path of the beam proceeding toward the polygonal mirror 72 from the point $P_0$ to the point $P_1$.

Since a deflection angle which is an angle formed between a central axis of the beam proceeding toward the polygonal mirror 72 and a reflective surface of the polygonal mirror changes between the rotational position $A_0$ and the rotational position $A_1$, the change of the deflection point is also considered as a phenomenon caused in connection with a change of the deflection angle.

Such a change of the deflection point inevitably occurs because a distance from a center C of the polygonal mirror 72 to the reflective surface 72c varies depending on positions on the reflective surface 72.

In a case where the position at which the line-like imaged is formed coincides with the point $P_0$, if the polygonal mirror 72 is positioned at the rotational position A1, the position at which the line-like image is formed shifts by the distance $d_0$ with respect to the current deflection point $P_1$. As a result, the conjugate relationship between the position of the line-like image and the outer surface of the photoconductive drum 74 is lost. That is, in actuality, the conjugate relationship holds only at a certain deflection angle.

Figure 12:
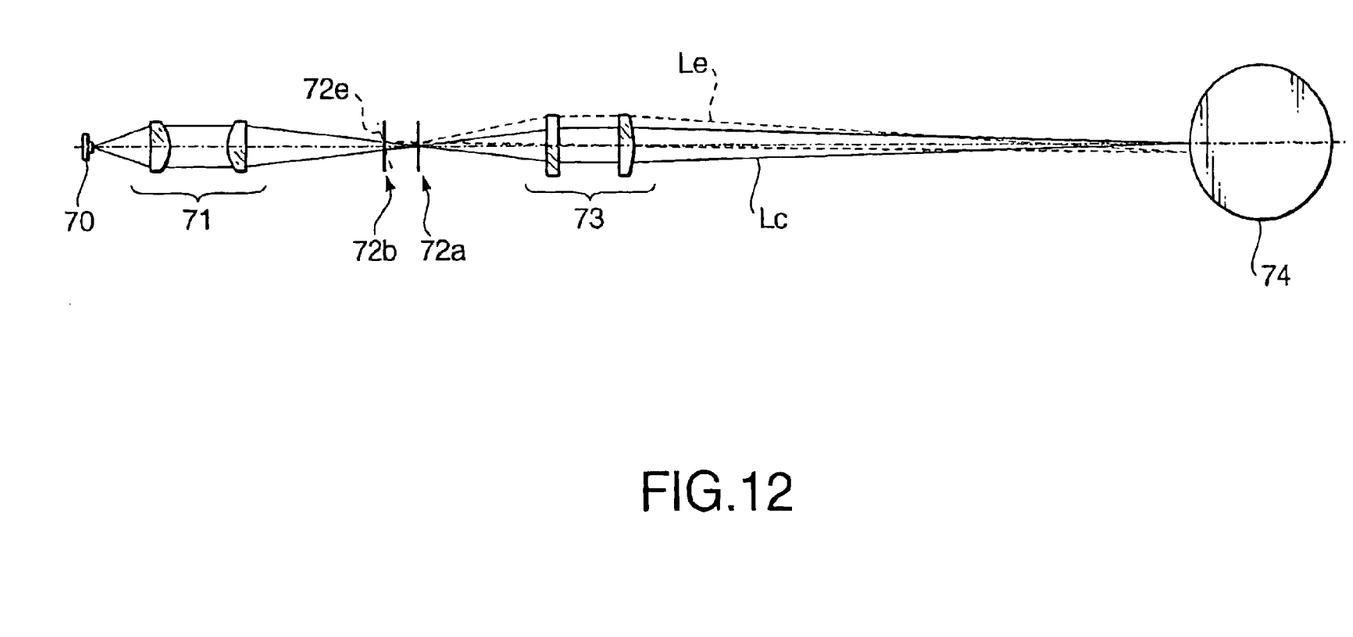
FIG. 12 is a side view of the scanning optical system shown in FIG. 10 illustrating an optical path when the facet error and a change of the deflection point occur.

FIG. 12 is a side view of the scanning optical system 2 illustrating the above mentioned phenomenon of the change of the deflection point. In FIG. 12, a numerical reference 72a indicates a position of the reflective surface of the polygonal mirror when the conjugate relation ship stands (i.e., when the deflection point is positioned at the point $P_0$ in FIG. 11). A numerical reference 72b indicates a position of the reflective surface in a situation where the deflection point is shifted from a proper position 72a.

A broken line 72e shown at the position 72b indicates a reflective surface of the polygonal mirror 72 tilted due to the facet error. As described above, the conjugate relationship is lost when the deflection point shifts form the proper position 72a. Therefore, when the beam is reflected by the tilted reflective surface 72e at the shifted deflection position 72b, a beam spot of a beam Le reflected by the tilted reflective surface 72e is formed at a position shifted in the auxiliary scanning direction on the scan target surface from an ideal position.

That is, the beam spot of the beam Le shifts from the beam spot of a beam Lc reflected by the normal reflective surface (72c) at the proper deflection position 72a. As a result, a scan line which is a locus of the beam spot on the scan target surface shifts in the auxiliary scanning direction from an ideal position.

Hereafter, such a phenomenon in which the scan line shifts on the scan target surface in the auxiliary scanning direction is referred to as "jitter in the auxiliary scanning direction". Further, the amount of the jitter in the auxiliary scanning direction is referred to as "jitter amount".

The jitter amount changes depending on: a lateral magnification of the imaging optical system 73 in the auxiliary scanning direction (m); a tilt angle of a reflective surface of the polygonal mirror with respect to the rotational axis of the polygonal mirror ($\phi$); and a shift amount of the deflection point from the position at which the line-like image is formed ($d_0$). The jitter amount increases as at least one of m, $\phi$ and $d_0$ increases.

Foe example, the jitter amount y' may be defined as:

$$y' = |2md_1\phi|$$

where $d_1$ represents the maximum shift amount of the deflection point from the position at which the line-like image is formed.

Figure 13:
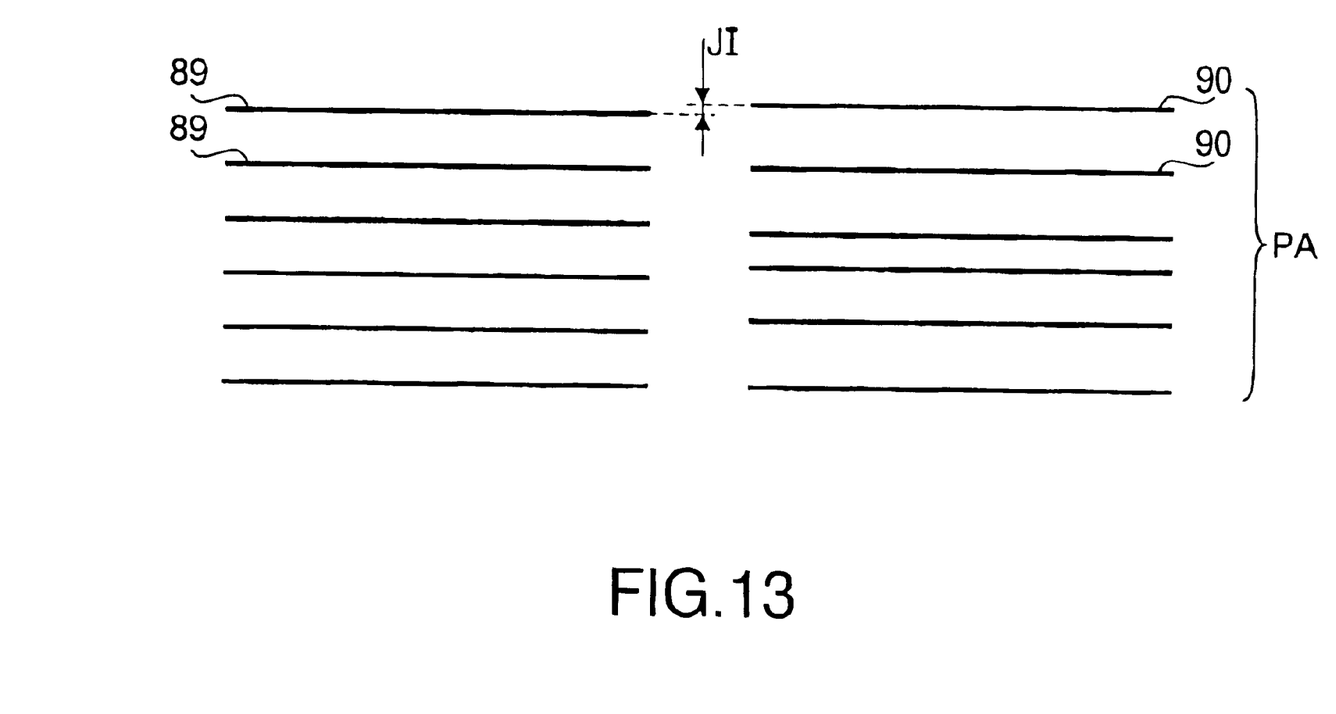
FIG. 13 illustrates normal scan lines having no jitter amounts and scan lines having jitter amounts which vary among a plurality of reflective surfaces of the polygonal mirror.

Meanwhile, a polygonal mirror has a plurality of reflective surfaces. Therefore, in many cases, tilt angles $\phi$ vary among the plurality of reflective surfaces. If the tilt angles $\phi$ vary among the plurality of reflective surfaces, the jitter amounts also vary among the plurality of reflective surfaces of the polygonal mirror. In FIG. 13, normal scan lines 89 having no jitter amounts are indicated on the left side, and scan lines 90 having jitter amounts JI which vary among the plurality of reflective surfaces are indicated on the right side.

When such variations of the jitter amounts occur, a jitter pattern PA repeats with rotations of the polygonal mirror. The variations of the jitter amount deteriorate imaging quality. In particular, when a back focus (i.e., a distance between the imaging optical system and the photoconductive drum) is lengthened to downsize a size of an apparatus (for example, a printer) accommodating the scanning optical system and to improve flexibility of mechanical design of the apparatus, the jitter amount increases and thereby the degree of reduction in imaging quality exceeds a permissible amount.

Preferably, the jitter amount is less than or equal to 5.0 $\mu$m when the resolution is 600 dpi (dots per inch), although the permissible jitter amount varies depending on resolution dpi. However, there is a case where the jitter amount of the conventional scanning optical system exceeds the permissible jitter amount of 5.0 $\mu$m. For example, the jitter amount of a scanning optical system shown in a practical example 4 of Japanese Provisional. Publication NO. HEI7-113950 takes a value of 7.0 $\mu$m.

Since, in general, if the number of reflection surfaces is less than or equal to 6 and if the lateral magnification in the auxiliary scanning direction |m|>1.85, the jitter amount produced by a conventional design technique of the scanning optical system exceeds 5.0 $\mu$m, which deteriorates the imaging quality considerably.

In Japanese Provisional Publication NO. HEI 5-142495, a configuration of a scanning optical system to avoid an ill effect of an error in which a distance between a rotational axis of a polygonal mirror and each reflective surface of the polygonal mirror varies from one reflective surface to another reflective surface is disclosed. However, the error of the polygonal mirror discussed in this publication is a manufacturing error of the polygonal mirror with regard to the distance between the rotational axis and each reflective surface. Therefore, the error discussed in the publication HEI 5-142495 is different from the above mentioned phenomenon of the change of the deflection point which occurs inevitably.

As described above, a problem caused by the phenomenon of the change of the deflection point (i.e., the variations of the jitter amounts) has not been resolved. One of fundamental solutions to this problem is to reduce the jitter amount by employing a polygonal mirror manufactured with extremely high accuracy.

However, a polygonal mirror manufactured using a typical manufacturing process usually has the facet error of about 180" (=0.00087 rad). To manufacture a polygonal mirror having precision higher than that of the polygonal mirror manufactured using the typical manufacturing process (i.e., to manufacture a polygonal mirror having the facet error less than 180") considerably increases the manufacturing cost of the polygonal mirror.

SUMMARY OF THE INVENTION

The present invention is advantageous in that it provides a scanning optical system which is capable of reducing the jitter amount in the auxiliary scanning direction caused in connection with the change of the deflection point and the facet error.

According to an aspect the invention, there is provided a scanning optical system for emitting a beam scanning in a main scanning direction. The scanning optical system is provided with a light source that emits the beam, a line-like image forming optical system that converges the beam emitted by the light source in an auxiliary scanning direction which is perpendicular to the main scanning direction, a polygonal mirror that rotates about its rotational axis to deflect the beam emerged from the line-like image forming optical system in the main scanning direction, and an imaging optical system that converges the beam deflected by the polygonal mirror to form a beam spot scanning on a scan target surface in the main scanning direction.

In this structure, the line-like image forming optical system forms a line-like image extending in the main scanning direction in the vicinity of a reflective surface of the polygonal mirror, and if the number of reflective surfaces of the polygonal mirror is less than or equal to six and if $|m|>1.85$, the following condition (1) is satisfied:

$$r<5\ \cos(w/2f)/[2|m|\{1-\cos(w/2f)\}] \quad (1)$$

where r represents a radius of an inscribed circle of the polygonal mirror, m represents a lateral magnification of the imaging optical system in the auxiliary scanning direction, f represents a focal length of the imaging optical system in the main scanning direction, and w represents half of a scanning width.

With this configuration, the jitter amount can be reduced less than or equal to the permissible amount of 5.0 μm even if the polygonal mirror includes the facet error of about 180".

Optionally, the scanning optical system may satisfy the following condition (2):

$$w/f>0.70 \quad (2).$$

With this configuration, even if the scanning optical system has relatively wide field angle w/f larger than 0.7 (w/f>0.7), the jitter amount can be reduced less than or equal to the permissible amount of 5.0 because the scanning optical system satisfies the condition (1).

Still optionally, if N>4, the following condition (3) may be satisfied:

$$wN/2\pi f>0.55 \quad (3)$$

where N represents the number of the reflective surfaces of the polygonal mirror.

In a particular case, the imaging optical system may have two lenses. With this structure, the lateral magnification of the imaging optical system in the auxiliary scanning direction can be reduced, and therefore the jitter amount can be effectively reduced.

In a particular case, refractive power in an auxiliary scanning plane of a lens surface of the imaging optical system located nearest to the scan target surface may be the largest of all lens surfaces of the imaging optical system. The auxiliary scanning plane is a plane which includes an optical axis of the imaging optical system and which is perpendicular to the main scanning direction. With this structure, the lateral magnification of the imaging optical system in the auxiliary scanning direction can be reduced, and therefore the jitter amount can be effectively reduced.

Optionally, a jitter amount may be less than or equal to 5.0 μm, the jitter amount being defined as a distance between a position of a scan line and an ideal position of the scan line in the auxiliary scanning direction on the scan target surface.

Still optionally, when the polygonal mirror is situated such that a position at which the line-like image is formed lies on a reflective surface of the polygonal mirror, the beam reflected from the polygonal mirror may proceed along an optical axis of the imaging optical system.

DETAILED DESCRIPTION OF THE EMBODIMENTS

Hereinafter, an embodiment according to the invention is described with reference to the accompanying drawings.

Figure 1:
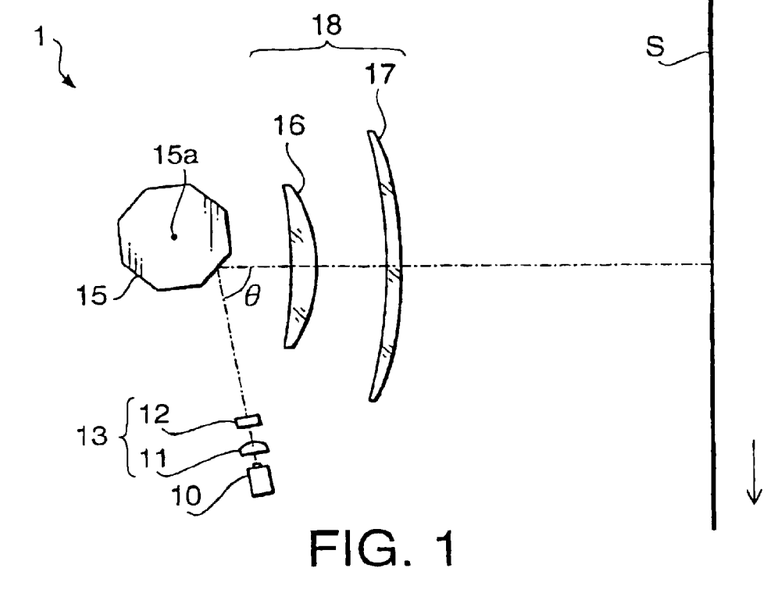
FIG. 1 shows an optical block diagram of a scanning optical system according to an embodiment of the present invention.
Figure 2:
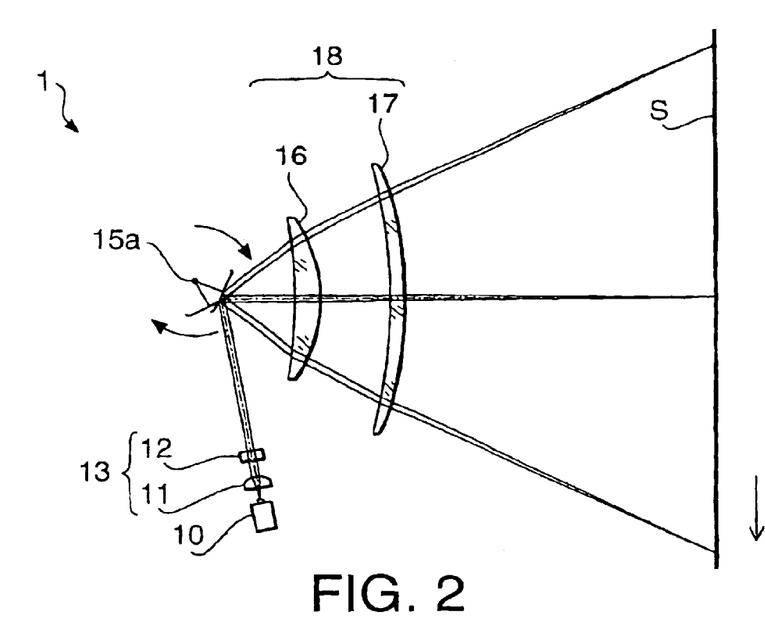
FIG. 2 illustrates scanning operation in which a beam is dynamically deflected by a rotating polygonal mirror of the scanning optical system.

Each of FIGS. 1 and 2 shows an optical block diagram of a scanning optical system 1 according to an embodiment of the present invention. The optical block diagram shown in each of FIGS. 1 and 2 is viewed along line parallel with a rotational axis 15a of a polygonal mirror 15.

As shown in FIGS. 1 and 2, the scanning optical system 1 includes a laser source 10 which emits a laser beam, a line-like image forming optical system 13 having a collimator lens 11 and a cylindrical lens 12, the polygonal mirror 15 which has a form of a hexagonal prism and which rotates about its rotational axis 15a, and an imaging optical system 18 having a first lens 16 and a second lens 17. A scan target S corresponds to, for example, an outer surface of a photoconductive drum. In FIG. 2, a scanning operation in which a beam is dynamically deflected by the rotating polygonal mirror 15 is illustrated.

In this embodiment, a direction perpendicular to both of the rotational axis 15a of the polygonal mirror 15 and an optical axis of the imaging optical system 18 corresponds to a main scanning system, and a direction parallel with the rotational axis 15a of the polygonal mirror 15 corresponds to an auxiliary scanning direction. An arrow shown in FIG. 1 indicates the main scanning direction. A plane which includes the optical axis of the imaging optical system 18 and which is perpendicular the rotational axis 15a of the polygonal mirror 15 is referred to as a main scanning plane. Further, a plane which includes the optical axis of the imaging lens system 18 and which is perpendicular to the main scanning plane is referred to as an auxiliary scanning plane.

The beam emitted by the laser source 10 as a divergent beam is collimated by the collimator lens 11 to form a collimated beam having an elliptical cross section. The beam emerged from the collimator lens 11 is converged by the cylindrical lens 12 in the auxiliary scanning direction to form a line-like image extending in the main scanning direction in the vicinity of a reflective surface of the polygonal mirror 15.

The polygonal mirror 15 rotating about the rotational axis 15a at a constant angular speed dynamically deflects the beam incident thereon. The imaging optical system 18 converges the beam deflected by the polygonal mirror 15 onto the scan target surface S to form a beam spot scanning in the main scanning direction at constant speed.

Since the scan target surface S is moved In the auxiliary scanning direction, a plurality of scan lines having constant intervals are formed on the scan target surface. By on/off modulating the beam using, for example, the laser source or a modulator (not shown) according to image information, a two dimensional image having a plurality of dots is formed on the scan target surface S.

As described above, with regard to the main scanning direction, the beam emitted by the laser source 10 is not converged when the beam is incident on the polygonal mirror 15. Then, the beam deflected by the polygonal mirror 15 is converged by the imaging optical system 18 in the main scanning direction onto the scan target surface.

With regard to the auxiliary scanning direction, the beam emitted by the laser source 10 is converged by the cylindrical lens 12 in the vicinity of the reflective surface of the polygonal mirror 15. Then, the beam deflected by the polygonal mirror 15 proceeds toward the imaging optical system 18 as a divergent beam and converged by the imaging optical system 18 onto the scan target surface S.

More specifically, the polygonal mirror 15 is positioned so that when a position at which the line-like imaged is formed exactly coincides with a deflection point on a reflective surface of the polygonal mirror 15, a chief ray of the beam reflected at the deflection point proceeds along the optical axis of the imaging optical system 18. In this situation (i.e., when the position of the line-like image coincides with the deflection point on the reflective surface of the polygonal mirror 15), the position of the line-like image and the scan target surface S become optically conjugate with each other in regard to the auxiliary scanning direction. Therefore, in this situation, deviation of a scanning position on the scan target surface S in the auxiliary scanning direction caused by the facet error is corrected and eliminated.

However, as described above, such a conjugate relationship between the position of the line-like image and the scan target surface does not always hold because the above mentioned "change of the deflection point" is caused in connection with rotations of the polygonal mirror 15. To reduce the "jitter amount" caused by the facet error and the loss of the conjugate relationship, the scanning optical system 1 employs the following configuration.

That is, if $|m|>1.85$, the scanning optical system 1 satisfies a condition:

$$r<5\ \cos(w/2f)/[2|m|\{1-\cos(w/2f)\}] \quad (1)$$

where r represents a radius of an inscribed circle of the polygonal mirror 15, m represents a lateral magnification of the imaging optical system 18 in the auxiliary scanning direction, f represents a focal length of the imaging optical system 18 in the main scanning plane, and w represents half of a scanning width. The scanning width is defined as a length by which the beam spot is scanned on the scan target surface in the main scanning direction.

When the condition (1) is satisfied even if an absolute value of the lateral magnification is larger than 1.85 ($|m|>1.85$), the jitter amount can be suppressed lower than or equal to 5.0 μm.

Figure 3:
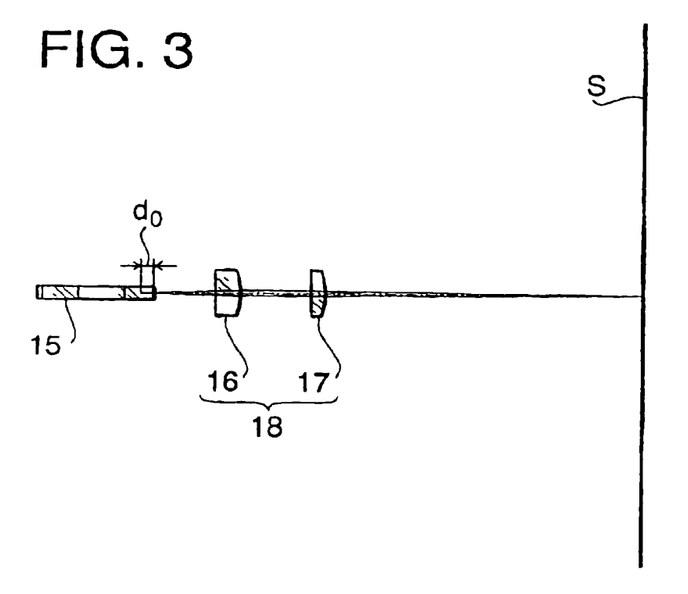
FIG. 3 is a side view of the scanning optical system viewed along a line perpendicular to an auxiliary scanning direction.

FIG. 3 is a side view of the scanning optical system 1 viewed along a line perpendicular to the auxiliary scanning direction. In FIG. 3, the amount of the change of the deflection point "$d_0$" is also indicated (see FIG. 11).

The scanning optical system 1 further satisfies the following conditions:

$$w/f>0.70 \quad (2)$$

$$wN/2\pi f>0.55 \quad (3)$$

where f represents the focal length of the imaging optical system 18 in the main scanning plane, w represents half of the scanning width, and N represents the number of reflective surfaces of the polygonal mirror 15.

When the condition (2) is satisfied, even if a field angle of the scanning optical system is large, the jitter amount can be sufficiently reduced. The condition (3) is satisfied when N is larger than 4 (N>4). If the number of the reflective surfaces of the polygonal mirror 15 is less than or equal to 4 (N≦4), the amount of the change of the deflection point "$d_0$" becomes too big, and the jitter amount can not be reduced sufficiently.

Hereafter, a comparative example which does not satisfy the condition (1) and three concrete examples according to the embodiment of the present invention will be described.

In the following examples, there is a case in which the imaging optical system 18 has a rotationally asymmetrical optical surface, and such a rotationally asymmetrical optical surface does not have an axis like a symmetry axis of a rotationally symmetrical optical surface. Therefore, a term an optical surface reference axis is defined as an axis passing through an origin that is set when the shap of the rotationally asymmetrical optical surface is described in a mathematical expression, and the optical surface reference axis will hereafter be regarded as one that corresponds to the symmetry axis of a rotationally symmetrical optical surface (i.e. the optical axis).

COMPARATIVE EXAMPLE

A scanning optical system of a comparative example has a configuration similar to the scanning optical system 1 according to the embodiment of the present invention. Therefore, the comparative example is explained below using the configuration shown in FIGS. 1–3.

In the comparative example, a total focal length of the imaging optical system 18 is 140 mm. The imaging optical system 18 has the lateral magnification of −2.15 in the auxiliary scanning direction and has the half scanning width of 108 mm. The polygonal mirror 15 has the radius of the inscribed circle of 20.00 mm and has six reflective surfaces. An angle θ (see FIG. 1) formed between the beam proceeding toward the polygonal mirror 15 and the optical axis of the imaging optical system 18 in the main scanning direction is −80.0°. The angle θ is negative when the beam proceeding toward the polygonal mirror 15 is inclined clockwise with respect to the optical axis of the imaging optical system 18 in the main scanning plane on FIG. 1. The angle θ is positive when the beam proceeding toward the polygonal mirror 15 is inclined counterclockwise with respect to the optical axis of the imaging optical system 18 in the main scanning plane on FIG. 1.

When these values (m, w and f) are assigned to the condition (1), the radius of the inscribed circle of the polygonal mirror 15 must take a value less than or equal to 14.7 mm. However, since the radius of the inscribed circle of the comparative example is 20.00 mm, the comparative example does not satisfy the condition (1).

TABLE 1 shows a concrete numerical configuration of the comparative example from the cylindrical lens 12 through the scan target surface S.

TABLE 1

| No. | Ry | Rz | D | n |
|---|---|---|---|---|
| #1 | ∞ | 33.20 | 4.00 | 1.5107 |
| #2 | ∞ | | 62.36 | |
| #3 | | | 28.00 | |
| #4 | −220.00 | −220.00 | 10.00 | 1.5192 |
| #5 | −50.93 | −50.93 | 25.00 | |
| #6 | −118.99 | 25.60 | 5.00 | 1.4862 |
| #7 | −156.70 | −156.70 | 112.00 | |

In TABLE 1, the character "No." indicates surface numbers that are assigned to optical surfaces in the comparative example starting from a front surface (a beam incident surface) of the cylindrical lens 12. The #1 and #2 denote the front surface and a rear surface (a beam emerging surface) of the cylindrical lens 12, respectively. The #3 denotes the reflective surface of the polygonal mirror 15. The #4 and #5 denote a front surface (a polygonal mirror side) and a rear surface (a scan target surface side) of the first lens 16 of the imaging optical system 18, respectively. The #6 and #7 denote a front surface and a rear surface of the second lens 17 of the imaging optical system 18, respectively.

The character "Ry" denotes a radius of curvature [mm] of each optical surface on its optical axis measured in the main scanning direction, and "Rz" denotes a radius of curvature [mm] of each optical surface on its optical axis measured in the auxiliary scanning direction. The character "D" denotes the distance [mm] between an optical surface and a next optical surface measured along the optical axis, and "n" denotes a refractive index of each lens at a design wavelength 780 nm (refractive indexes for the air are omitted).

As can be seen from TABLE 1, the front surface of the cylindrical lens 12 is a cylindrical surface (i.e., a convex surface), and the rear surface of the cylindrical lens 12 is a flat surface. The front surface #4 of the first lens 16 and the rear surface #7 of the second lens 17 are spherical surfaces.

The rear surface #5 of the first lens 16 is a rotationally symmetrical aspherical surface. The rotationally symmetrical aspherical surface is expressed by a following equation:

$$X(h) = \frac{\left(\frac{1}{Ry}\right)h^2}{1+\sqrt{1-(1+\kappa)^2 h^2 \left(\frac{1}{Ry}\right)^2}} + A_4 h^4 + A_6 h^6 + A_8 h^8 + A_{10} h^{10} \ldots \quad (4)$$

where X(h) represents a SAG amount which is a distance between a point on the aspherical surface at a height of h from the optical axis and a plane tangential to the aspherical surface at the optical axis. κ represents a conical coefficient, and $A_4$, $A_6$ and $A_8$ are aspherical coefficients of $4^{th}$, $6^{th}$ and $8^{th}$ orders, respectively. Ry is the radius of curvature of the rotationally symmetrical aspherical surface on the optical axis indicated in TABLE 1.

The conical coefficient and aspherical coefficients of the rear surface #5 of the first lens 16 are indicated in TABLE 2.

TABLE 2

| | #5 |
|---|---|
| κ | 0.0 |
| $A_4$ | 1.73E−06 |
| $A_6$ | 4.44E−10 |
| $A_8$ | −5.90E−13 |
| $A_{10}$ | 2.12E−16 |

The front surface #6 of the second lens 17 is an anamorphic aspherical surface whose cross section in the main scanning direction is defined by a function of a height from the optical axis in the main scanning direction and whose curvature of a cross section in the auxiliary scanning direction is defined by a function of a height from the optical axis in the main scanning direction.

The anamorphic aspherical surface is defined by the following equations.

$$X(Y) = \frac{\left(\frac{1}{Ry}\right)Y^2}{1+\sqrt{1-(1+\kappa)^2 Y^2 \left(\frac{1}{Ry}\right)^2}} + AM_1 Y + AM_2 Y^2 + AM_3 Y^3 + \\ AM_4 Y^4 + AM_5 Y^5 + AM_6 Y^6 + AM_7 Y^7 + AM_8 Y^8 \ldots \quad (5)$$

$$\frac{1}{Rz(Y)} = \frac{1}{Rz} + AS_1 Y + AS_2 Y^2 + AS_3 Y^3 + AS_4 Y^4 + AS_5 Y^5 + \\ AS_6 Y^6 + AS_7 Y^7 + AS_8 Y^8 \ldots \quad (6)$$

where X(Y) is a SAG amount which is obtained as a function of a coordinate Y extending in the main scanning direction. The SAG amount X(Y) represents a distance between a plane tangential to the anamorphic aspherical surface at the optical axis and a point on a curved line extending along the anamorphic aspherical surface in the main scanning direction and passing the optical axis thereof. 1/Ry represents curvature of the anamorphic aspherical surface in the main scanning direction at the optical axis. Further, 1/Rz(Y) represents curvature of an arc extending in the auxiliary scanning direction, and the arc is intersecting the curved line at the point whose coordinate is Y. κ represents a conical coefficient, and $AM_n$ is an aspherical coefficient of $n^{th}$ order for the main scanning direction. $AS_n$ is an aspherical coefficient of $n^{th}$ order for determining the curvature in the auxiliary scanning direction.

Values of the coefficients for the front surface #6 of the second lens 17 are indicated in TABLE 3.

TABLE 3 surface #6 (anamorphic aspherical surface)

κ = 0.0

| | |
|---|---|
| $AM_1$ = 0.00E+00 | $AS_1$ = −2.16E−05 |
| $AM_2$ = 0.00E+00 | $AS_2$ = −1.04E−06 |
| $AM_3$ = 0.00E+00 | $AS_3$ = 0.00E+00 |
| $AM_4$ = 1.21E−06 | $AS_4$ = −2.54E−09 |
| $AM_5$ = 0.00E+00 | $AS_5$ = 0.00E+00 |
| $AM_6$ = −1.26E−10 | $AS_6$ = 9.53E−13 |
| $AM_7$ = 0.00E+00 | $AS_7$ = 0.00E+00 |
| $AM_8$ = −4.61E−14 | $AS_8$ = −1.19E−16 |
| $AM_9$ = 0.00E+00 | $AS_9$ = 0.00E+00 |
| $AM_{10}$ = 1.97E−17 | $AS_{10}$ = 0.00E+00 |
| $AM_{11}$ = 0.00E+00 | $AS_{11}$ = 0.00E+00 |

TABLE 3-continued surface #6 (anamorphic aspherical surface)

$\kappa = 0.0$

| | |
|---|---|
| $AM_{12} = -2.49E-21$ | $AS_{12} = 0.00E+00$ |
| $AM_{13} = 0.00E+00$ | $AS_{13} = 0.00E+00$ |
| $AM_{14} = 5.76E-26$ | $AS_{14} = 0.00E+00$ |

The scanning optical system of the comparative example having the above mentioned numerical configuration has the maximum amount of the change of the deflection point of 1.59 mm. When the jitter amount is defined by the above mentioned definition ($y'=|2md_1\phi|$) and the tilt angle $\phi$ takes a typical value of 0.00087 rad, the maximum jitter amount is 5.9 μm which exceeds the permissible jitter amount of 5.0 μm.

Figure 4:
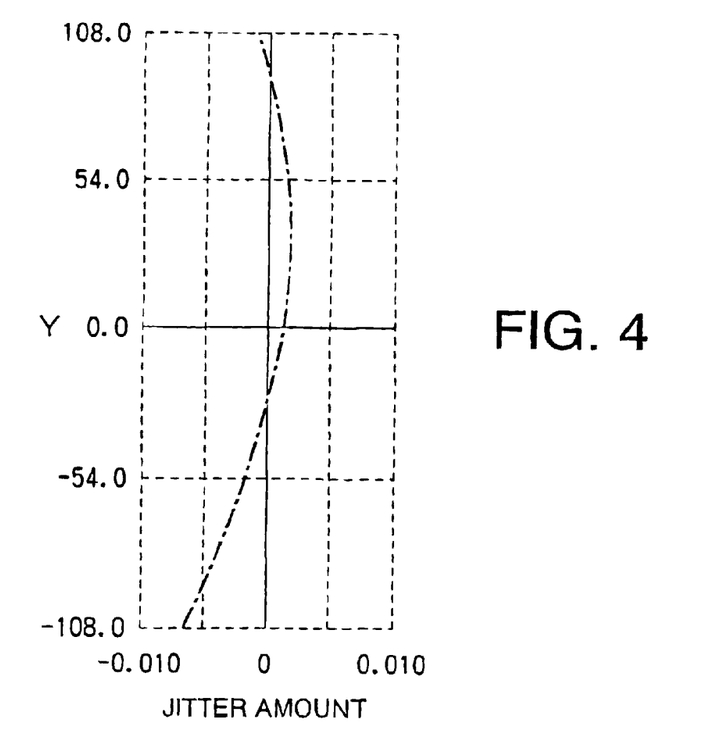
FIG. 4 is a graph illustrating a jitter amount of a comparative example.

FIG. 4 is a graph illustrating the jitter amount of the comparative example. In FIG. 4 (and in FIGS. 5–7, a vertical axis represents a height Y from the optical axis on the scan target surface S, and a horizontal axis represents a shift amount (i.e., the jitter amount) of the beam spot from an ideal position in the auxiliary scanning direction (unit: mm). As can be seen form FIG. 4, the jitter amount of the comparative example exceeds the permissible jitter amount of 5.0 μm.

FIRST EXAMPLE

A first example according to the embodiment of the present invention will be described. A scanning optical system of the first example has a configuration similar to the scanning optical system 1 according to the embodiment of the present invention. Therefore, the first example is explained using the configuration shown in FIGS. 1–3.

In the first example, a total focal length of the imaging optical system 18 is 150 mm. The imaging optical system 18 has the lateral magnification of −2.22 in the auxiliary scanning direction and has the half scanning width of 108 mm. The polygonal mirror 15 has the radius of the inscribed circle of 12.1 mm and has six reflective surfaces. The angle θ (see FIG. 1) formed between the beam proceeding toward the polygonal mirror 15 and the optical axis of the imaging optical system 18 in the main scanning direction is −80.0°.

When these values (m, w and f) are assigned to the condition (1), the radius of the inscribed circle of the polygonal mirror 15 must take a value less than or equal to 16.4 mm. As described above, the first example has the radius of the inscribed circle of 12.1 mm, and therefore the first example satisfies the condition (1).

TABLE 4 shows a concrete numerical configuration of the first example from the cylindrical lens 12 through the scan target surface S. Symbols and fields of TABLE 4 have the same meanings as those of TABLE 1.

TABLE 4

| No. | Ry | Rz | D | n |
|---|---|---|---|---|
| #1 | ∞ | 33.20 | 4.00 | 1.5107 |
| #2 | ∞ | | 62.36 | |
| #3 | | | 28.00 | |
| #4 | −220.00 | −220.00 | 10.00 | 1.5192 |
| #5 | −53.70 | −53.70 | 27.00 | |
| #6 | −121.40 | 26.46 | 5.00 | 1.4862 |
| #7 | −157.60 | −157.60 | 120.00 | |

As can be seen from TABLE 4, the front surface of the cylindrical lens 12 is a cylindrical surface (i.e., a convex surface), and the rear surface of the cylindrical lens 12 is a flat surface. The front surface #4 of the first lens 16 and the rear surface #7 of the second lens 17 are spherical surfaces.

The rear surface #5 of the first lens 16 is a rotationally symmetrical aspherlcal surface expressed by the above mentioned equation (4). The conical coefficient and aspherical coefficients of the rear surface #5 of the first lens 16 are indicated in TABLE 5.

TABLE 5

| | #5 |
|---|---|
| κ | 0.0 |
| $A_4$ | 1.77E−06 |
| $A_6$ | 9.58E−11 |
| $A_8$ | −1.93E−13 |

The front surface #6 of the second lens 17 is an anamorphic aspherical surface expressed by the above mentioned equations (5) and (6). Values of the coefficients for the front surface #6 of the second lens 17 are indicated in TABLE 6.

TABLE 6 surface #6 (anamorphic aspherical surface)

$\kappa = 0.0$

| | |
|---|---|
| $AM_1 = 0.00E+00$ | $AS_1 = -1.24E-05$ |
| $AM_2 = 0.00E+00$ | $AS_2 = -1.51E-06$ |
| $AM_3 = 0.00E+00$ | $AS_3 = 0.00E+00$ |
| $AM_4 = 1.13E-06$ | $AS_4 = -2.08E-09$ |
| $AM_5 = 0.00E+00$ | $AS_5 = 0.00E+00$ |
| $AM_6 = -1.39E-10$ | $AS_6 = 7.77E-13$ |
| $AM_7 = 0.00E+00$ | $AS_7 = 0.00E+00$ |
| $AM_8 = -2.26E-14$ | $AS_8 = -9.95E-17$ |
| $AM_9 = 0.00E+00$ | $AS_9 = 0.00E+00$ |
| $AM_{10} = 1.54E-17$ | $AS_{10} = 0.00E+00$ |
| $AM_{11} = 0.00E+00$ | $AS_{11} = 0.00E+00$ |
| $AM_{12} = -3.73E-21$ | $AS_{12} = 0.00E+00$ |
| $AM_{13} = 0.00E+00$ | $AS_{13} = 0.00E+00$ |
| $AM_{14} = 3.66E-25$ | $AS_{14} = 0.00E+00$ |

The scanning optical system of the first example having the above mentioned numerical configuration has the maximum amount of the change of the deflection point of 0.83 mm. When the jitter amount is defined by the above mentioned definition ($y'=|2md_1\phi|$) and the tilt angle $\phi$ takes a typical value of 0.00087 rad, the jitter amount is 3.2 μm. Therefore, the first example has the sufficiently reduced maximum jitter amount of 3.2 μm.

Figure 5:
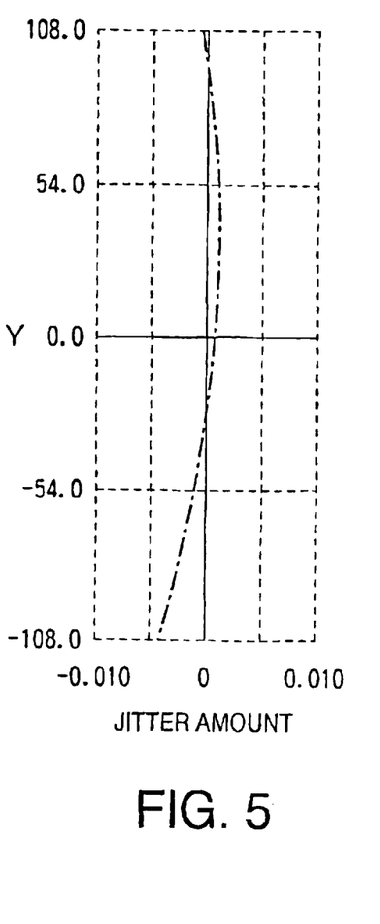
FIG. 5 is a graph illustrating the jitter amount of a first example.

FIG. 5 is a graph illustrating the jitter amount of the first example. As can be seen form FIG. 5, the jitter amount of the first example is sufficiently reduced in comparison with the jitter amount of the comparative example shown in FIG. 4.

The first example has w/f of 0.72 and wN/2πf of 0.69. Therefore the first example satisfies the conditions (2) and (3).

SECOND EXAMPLE

A second example according to the embodiment of the present invention will be described. A scanning optical system of the second example has a configuration similar to the scanning optical system 1 according to the embodiment of the present invention. Therefore, the second example is explained using the configuration shown in FIGS. 1–3.

In the second example, a total focal length of the imaging optical system 18 is 150 mm. The imaging optical system 18 has the lateral magnification of −2.07 in the auxiliary scanning direction and has the half scanning width of 108 mm. The polygonal mirror 15 has the radius of the inscribed circle of 12.1 mm and has six reflective surfaces. The angle θ (see FIG. 1) formed between the beam proceeding toward the polygonal mirror 15 and the optical axis of the imaging optical system 18 in the main scanning direction is −80.0°.

When these values (m, w and f) are assigned to the condition (1) the radius of the inscribed circle of the polygonal mirror 15 must take a value less than or equal to 17.6 mm. As described above, the second example has the radius of the inscribed circle of 12.1 mm, and therefore the second example satisfies the condition (1).

TABLE 7 shows a concrete numerical configuration of the second example from the cylindrical lens 12 through the scan target surface S. Symbols and fields of TABLE 7 have the same meanings as those of TABLE 1.

TABLE 7

| No. | Ry | Rz | D | n |
|---|---|---|---|---|
| #1 | ∞ | 33.20 | 4.00 | 1.5107 |
| #2 | ∞ | | 62.36 | |
| #3 | | | 28.00 | |
| #4 | −220.00 | −220.00 | 10.00 | 1.5192 |
| #5 | −54.71 | −54.71 | 27.00 | |
| #6 | −243.72 | −243.72 | 5.00 | 1.4862 |
| #7 | −380.58 | −21.26 | 120.00 | |

As can be seen from TABLE 7, the front surface of the cylindrical lens 12 is a cylindrical surface (i.e., a convex surface), and the rear surface of the cylindrical lens 12 is a flat surface. The front surface #4 of the first lens 16 and the front surface #6 of the second lens 17 are spherical surfaces.

The rear surface #5 of the first lens 16 is a rotationally symmetrical aspherical surface expressed by the above mentioned equation (4). The conical coefficient and aspherical coefficients of the rear surface #5 of the first lens 16 are indicated in TABLE 8.

TABLE 8

| | #5 |
|---|---|
| κ | 0.0 |
| $A_4$ | 1.55E−06 |
| $A_6$ | −2.38E−11 |
| $A_8$ | −8.65E−14 |

The rear surface #7 of the second lens 17 is an anamorphic aspherical surface expressed by the above mentioned equations (5) and (6). Values of the coefficients for the rear surface #7 of the second lens 17 are indicated in TABLE 9.

TABLE 9

| surface #7 (anamorphic aspherical surface) | |
|---|---|
| κ = 0.0 | |
| $AM_1$ = 0.00E+00 | $AS_1$ = 1.06E−05 |
| $AM_2$ = 0.00E+00 | $AS_2$ = 4.32E−06 |
| $AM_3$ = 0.00E+00 | $AS_3$ = 0.00E+00 |
| $AM_4$ = −9.06E−07 | $AS_4$ = −2.63E−09 |
| $AM_5$ = 0.00E+00 | $AS_5$ = 0.00E+00 |
| $AM_6$ = 2.05E−10 | $AS_6$ = 7.44E−13 |
| $AM_7$ = 0.00E+00 | $AS_7$ = 0.00E+00 |
| $AM_8$ = −6.62E−14 | $AS_8$ = −9.40E−17 |
| $AM_9$ = 0.00E+00 | $AS_9$ = 0.00E+00 |
| $AM_{10}$ = 1.82E−17 | $AS_{10}$ = 0.00E+00 |
| $AM_{11}$ = 0.00E+00 | $AS_{11}$ = 0.00E+00 |
| $AM_{12}$ = −3.05E−21 | $AS_{12}$ = 0.00E+00 |
| $AM_{13}$ = 0.00E+00 | $AS_{13}$ = 0.00E+00 |
| $AM_{14}$ = 2.48E−25 | $AS_{14}$ = 0.00E+00 |

The scanning optical system of the second example having the above mentioned numerical configuration has the maximum amount of the change of the deflection point of 0.83 mm. When the Jitter amount is defined by the above mentioned definition (y'=|2md$_1$φ|) and the tilt angle φ takes a typical value of 0.00087 rad, the jitter amount is 3.0 μm. Therefore, the second example has the sufficiently reduced maximum jitter amount of 3.0 μm.

Figure 6:
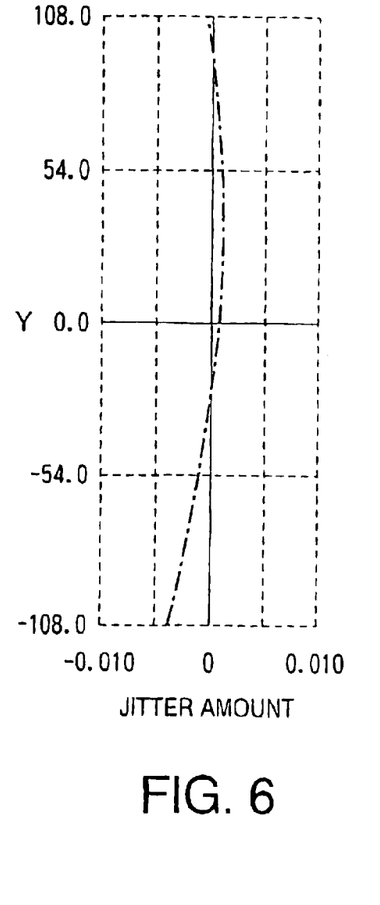
FIG. 6 is a graph illustrating the jitter amount of a second example.

FIG. 6 is a graph illustrating the jitter amount of the second example. As can be seen form FIG. 6, the jitter amount of the second example is sufficiently reduced in comparison with the jitter amount of the comparative example shown in FIG. 4.

The second example has w/f of 0.72 and wN/2πf of 0.69, and therefore the second example satisfies the conditions (2) and (3).

THIRD EXAMPLE

A third example according to the embodiment of the present invention will be described. A scanning optical system of the third example has a configuration similar to the scanning optical system 1 according to the embodiment of the present invention. Therefore, the third example is explained using the configuration shown in FIGS. 1–3.

In the third example, a total focal length of the imaging optical system 18 is 140 mm. The imaging optical system 18 has the lateral magnification of −1.92 in the auxiliary scanning direction and has the half scanning width of 108 mm. The polygonal mirror 15 has the radius of the inscribed circle of 13.9 mm and has six reflective surfaces. The angle θ (see FIG. 1) formed between the beam proceeding toward the polygonal mirror 15 and the optical axis of the imaging optical system 18 in the main scanning direction is −80.0°.

When these values (m, w and f) are assigned to the condition (1), the radius of the inscribed circle of the polygonal mirror 15 must take a value less than or equal to 17.0 mm. As described above, the third example has the radius of the inscribed circle of 13.9 mm, and therefore the third example satisfies the condition (1).

TABLE 10 shows a concrete numerical configuration of the third example from the cylindrical lens 12 through the scan target surface S. Symbols and fields of TABLE 10 have the same meanings as those of TABLE 1.

TABLE 10

| No. | Ry | Rz | D | n |
|---|---|---|---|---|
| #1 | ∞ | 33.20 | 4.00 | 1.5107 |
| #2 | ∞ | | 62.36 | |
| #3 | | | 28.00 | |
| #4 | −220.00 | −220.00 | 10.00 | 1.5192 |
| #5 | −52.20 | −52.20 | 27.00 | |
| #6 | −250.85 | −250.85 | 5.00 | 1.4862 |
| #7 | −395.94 | −20.78 | 110.00 | |

As can be seen from TABLE 10, the front surface of the cylindrical lens 12 is a cylindrical surface (i.e., a convex surface), and the rear surface of the cylindrical lens 12 is a flat surface. The front surface #4 of the first lens 16 and the front surface #6 of the second lens 17 are spherical surfaces.

The rear surface #5 of the first lens 16 is a rotationally symmetrical aspherical surface expressed by the above mentioned equation (4). The conical coefficient and aspherical coefficients of the rear surface #5 of the first lens 16 are indicated in TABLE 11.

TABLE 11

| | #5 |
|---|---|
| κ | 0.0 |
| $A_4$ | 1.51E-06 |
| $A_6$ | -1.12E-10 |
| $A_8$ | 3.64E-14 |

The rear surface #7 of the second lens 17 is an anamorphic aspherical surface expressed by the above mentioned equations (5) and (6). Values of the coefficients for the rear surface #7 of the second lens 17 are indicated in TABLE 12.

TABLE 12 surface #7 (anamorphic aspherical surface)

κ = 0.0

| | |
|---|---|
| $AM_1$ = 0.00E+00 | $AS_1$ = 1.13E-05 |
| $AM_2$ = 0.00E+00 | $AS_2$ = 4.30E-06 |
| $AM_3$ = 0.00E+00 | $AS_3$ = 0.00E+00 |
| $AH_4$ = -9.16E-07 | $AS_4$ = -2.47E-09 |
| $AM_5$ = 0.00E+00 | $AS_5$ = 0.00E+00 |
| $AM_6$ = 2.25E-10 | $AS_6$ = 6.65E-13 |
| $AM_7$ = 0.00E+00 | $AS_7$ = 0.00E+00 |
| $AM_8$ = -6.97E-14 | $AS_8$ = -8.21E-17 |
| $AM_9$ = 0.00E+00 | $AS_9$ = 0.00E+00 |
| $AM_{10}$ = 1.62E-17 | $AS_{10}$ = 0.00E+00 |
| $AM_{11}$ = 0.00E+00 | $AS_{11}$ = 0.00E+00 |
| $AM_{12}$ = -2.27E-21 | $AS_{12}$ = 0.00E+00 |
| $AM_{13}$ = 0.00E+00 | $AS_{13}$ = 0.00E+00 |
| $AM_{14}$ = 1.47E-25 | $AS_{14}$ = 0.00E+00 |

The scanning optical system of the third example having the above mentioned numerical configuration has the maximum amount of the change of the deflection point of 1.10 mm. When the jitter amount is defined by the above mentioned definition (y'=|2md$_1$φ|) and the tilt angle φ takes a typical value of 0.00087 rad, the jitter amount is 3.5 μm. Therefore, the third example has the sufficiently reduced maximum jitter amount of 3.5 μm.

Figure 7:
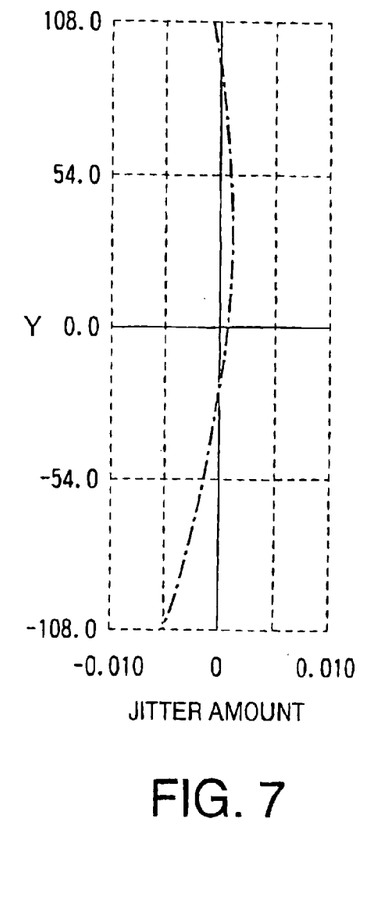
FIG. 7 is a graph illustrating the jitter amount of a third example.

FIG. 7 is a graph illustrating the jitter amount of the third example. As can be seen form FIG. 7, the jitter amount of the third example is sufficiently reduced in comparison with the jitter amount of the comparative example shown in FIG. 4.

The third example has w/f of 0.77 and wN/2πf of 0.74, and therefore the second example satisfies the conditions (2) and (3).

As described above, by satisfying the condition (1), the jitter amount of the scanning optical-system can be reduced less than or equal to the permissible jitter amount of 5.0 μm. Even if the total length of the scanning optical system is relatively sort and the back focus of the scanning optical system is relatively long, the jitter amount can be reduced sufficiently.

Although the present invention has been described in considerable detail with reference to certain preferred embodiments thereof, other embodiments are possible.

The present disclosure relates to the subject contained in Japanese Patent Application No. P2002-346973, filed on Nov. 29, 2002, which is expressly rated herein by reference in its entirety.

What is claimed is:

1. A scanning optical system for emitting a beam scanning in a main scanning direction, comprising:

a light source that emits the beam;

a line-like image forming optical system that converges the beam emitted by the light source in an auxiliary scanning direction which is perpendicular to the main scanning direction;

a polygonal mirror that rotates about its rotational axis to deflect the beam emerged from said line-like image forming optical system in the main scanning direction; and an imaging optical system that converges the beam deflected by said polygonal mirror to form a beam spot scanning on a scan target surface in the main scanning direction, wherein said line-like image forming optical system forms a line-like image extending in the main scanning direction in the vicinity of a reflective surface of said polygonal mirror, wherein if the number of reflective surfaces of said polygonal mirror is less than or equal to six and if |m|>1.85, the following condition (1) is satisfied:

$$r<5\ \cos(w/2f)/[2|m|\{1-\cos(w/2f)\}] \tag{1}$$

where r represents a radius of an inscribed circle of said polygonal mirror, m represents a lateral magnification of said imaging optical system in the auxiliary scanning direction, f represents a focal length of said imaging optical system in the main scanning direction, and w represents half of a scanning width.

2. The scanning optical system according to claim 1, wherein the following condition (2) is satisfied:

$$w/f>0.70 \tag{2}$$

3. The scanning optical system according to claim 1, wherein if N>4, the following condition (3) is satisfied:

$$wN/2\pi f>0.55 \tag{3}$$

where N represents the number of the reflective surfaces of said polygonal mirror.

4. The scanning optical system according to claim 1, wherein said imaging optical system has two lenses.

5. The scanning optical system according to claim 1, wherein refractive power in an auxiliary scanning plane of a lens surface of said imaging optical system located nearest to the scan target surface is the largest of all lens surfaces of said imaging optical system, wherein the auxiliary scanning plane is a plane which includes an optical axis of said imaging optical system and which is perpendicular to the main scanning direction.

6. The scanning optical system according to claim 1, wherein a jitter amount is less than or equal to 5.0 μm, the jitter amount being defined as a distance between a position of a scan line and an ideal position of the scan line in the auxiliary scanning direction on the scan target surface.

7. The scanning optical system according to claim 1, wherein when said polygonal mirror is situated such that a position at which the line-like image is formed lies on a reflective surface of said polygonal mirror, the beam reflected from said polygonal mirror proceeds along an optical axis of said imaging optical system.

* * * * *